Nov. 24, 1953 — O. H. SCHUCK ET AL — 2,660,056

ANGLE OF ATTACK SENSING DEVICE

Filed Feb. 3, 1949

Fig. 3.

INVENTORS
OSCAR HUGO SCHUCK
ROSS C. ALDERSON
BY
George H Fisher
ATTORNEY

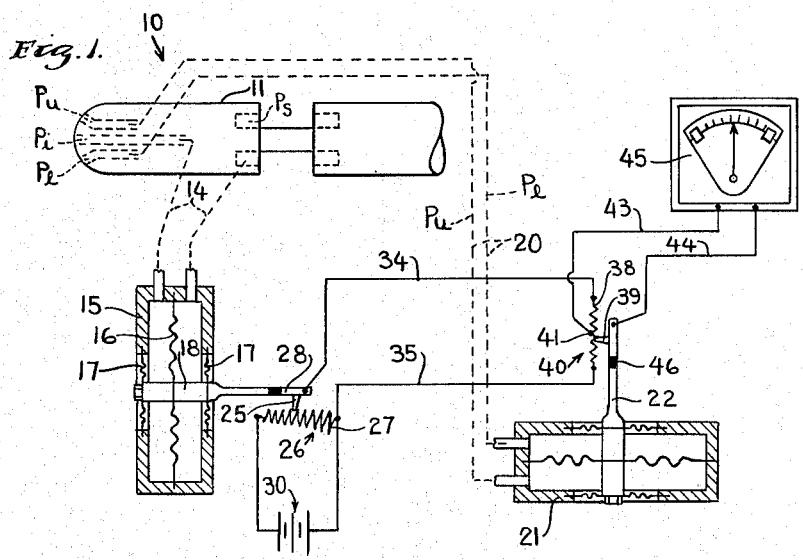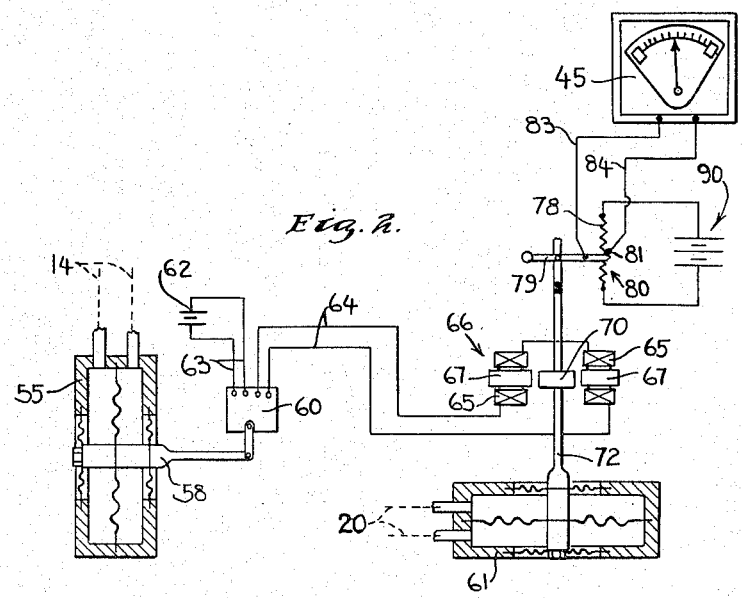

Patented Nov. 24, 1953

2,660,056

UNITED STATES PATENT OFFICE 2,660,056

ANGLE OF ATTACK SENSING DEVICE

Oscar Hugo Schuck and Ross C. Alderson, Minneapolis, Minn., assignors to Minneapolis-Honeywell Regulator Company, Minneapolis, Minn., a corporation of Delaware Application February 3, 1949, Serial No. 74,426

9 Claims. (Cl. 73—180)

This invention relates to an angle of attack indicator or controlling device for an aircraft and has for an object to provide an improved angle of attack indicating or controlling apparatus which is highly accurate, stable, and sensitive.

Another object of this invention is to provide an angle of attack indicator which will operate correctly for all air speeds of the aircraft.

It is a further object of this invention to provide an angle of attack indicating or controlling device which will also serve as a stall warning device and which can be used to supply a controlling signal to correct a dangerously high angle of attack condition.

A further object of this invention is to provide in an angle of attack indicating apparatus of the pressure orifice type a magnetic spring or biasing arrangement which effects a force feedback against a control device responding to the impact and angle of attack pressures to increase the stability of the apparatus.

A still further object of this invention is to provide in an angle of attack indicator for the variable energization of the magnetic spring or restoring forces against the angle of attack pressures such that the bias will be a measure of the air speed of the aircraft.

It is also an object of this invention to provide an angle of attack indicating or controlling device of the orifice type which utilizes a simplified electrical circuit and simplified electromagnetic devices rather than mechanical structures to supply the signal output proportional to the angle of attack sensed by the pressure orifices.

These and other objects and advantages of this invention will become apparent upon the reading of the specification in the light of the accompanying drawing, in which Figure 1 is a schematic circuit of a simplified embodiment of this invention;

Figure 2 is a schematic circuit of another embodiment of this invention; and

Figure 3 is a schematic circuit of the preferred embodiment of this invention.

In the embodiment of Figure 1, a sensing or pressure head 10 discloses a conventional Pitot static tube with angle of attack sensing orifices indicated generally at $P_u$ and $P_l$. This type of device is conventionally known as a Prandtl tube and consists of a hemispherical end on a cylindrical strut 11 which carries the orifices as shown in Figure 1. The Pitot static tube includes the impact or ram pressure orifice indicated at $P_i$ and static openings indicated at $P_s$. The impact orifice $P_i$ is located in the center of the hemispherical end of the cylindrical strut 11 and the angle of attack sensing orifices $P_u$ and $P_l$ are displaced above and below the impact orifices a given angular distance therefrom. The angular displacement of the angle of attack sensing orifices $P_u$ and $P_l$ from the impact or centrally located orifice $P_i$ determines the pressure differences obtained from such orifices as related to the angle of attack of the aircraft. Angle of attack as referred to herein describes the angular relationship between a line extending centrally through the cylindrical strut 11 and impact orifice $P_i$ and the line of the relative air flow. The angular displacement of the orifices $P_u$ and $P_l$ from $P_i$ referred to above must be related to a calibration constant incorporated into the apparatus responding to the pressures.

The orifices of the Pitot static tube, namely $P_i$ and $P_s$, are connected by suitable tubes 14 to a differential pressure responsive device 15, such as a bellows or diaphragm. In Figure 1 the tubes 14 and 20 have also been identified by $P_i$, $P_s$, $P_l$, $P_u$ to identify them with the pressure in each said tube and to correlate Figure 1 with Figure 2 in which the sensing head 10 has been omitted. Pressure responsive device 15 is shown as an enclosed chamber having a centrally located main diaphragm 16 and a pair of sealing diaphragms 17 to define the enclosed areas to which the pressure orifices are connected. An actuating rod 18 is connected to the center of the diaphragms 16 and 17 and is movable upon variation of the differences in pressures on either side of the main diaphragm. Similarly, the angle of attack sensing orifices $P_u$ and $P_l$ are connected by means of tubes 20 to another differential pressure responsive device 21 such as a bellows or diaphragm. Pressure responsive device 21 is shown as identical to pressure responsive device 15 and operates in the same manner except that it responds to the difference in pressure between the angle of attack sensing orifices $P_u$ and $P_l$. Pressure responsive device 21 has attached thereto an actuating rod 22 which is similar in all respects to actuating rod 18 of device 15 except that it responds in movement to the difference in pressure between the angle orifices $P_u$ and $P_l$. This pressure difference, namely $(P_l - P_u)$, is a function of the angularity of this Prandtl tube or sensing device to the air stream and hence is a function of the angle of attack. This function, however, is dependent upon the impact pressure of the air flow, more specifically, the relationship may be written $$\alpha = K \frac{P_l - P_u}{P_i - P_s}$$

where $\alpha$ is the angle of attack, and $K$ is the constant governed by the angular displacement or arrangement of the side orifices from the impact orifice. The present invention is directed toward the utilization of these pressure differences in these orifices of the Prandtl tube to control the energization of the electric circuit whose output signal can be interpreted in terms of $\alpha$ or angle of attack.

The pressure sensing device or bellows 15 through its operating shaft 18 controls the movement of a potentiometer wiper 25 of potentiometer 26 along the winding 27. Wiper 25 is insulated from rod 18 as indicated at 28. Potentiometer 26 is a non-linear potentiometer whose resistance winding 27 is tapered so that the resistance between the right-hand end and slider 25 varies inversely to the linear movement of slider 28 to the right. Since rod 18 moves in accordance with $P_i-P_s$, the resistance varies as $$\frac{1}{P_i-P_s}$$

that is, in inverse proportion to impact pressure minus static pressure. Winding 27 is energized from any suitable source of direct current 30 connected to the extremities of the potentiometer winding. One extremity of potentiometer 27 and the wiper 25 of potentiometer 26 are connected by means of conductors 34 and 35 to the extremities of another potentiometer winding 38. Winding 38 and a wiper 39 form a potentiometer 40 which is energized from potentiometer or voltage divider arrangement 26 and which is controlled by pressure responsive element 21. Winding 38 is center-tapped, as at 41, and a conductor 43 connects to this point a voltmeter 45 calibrated to indicate the angle of attack. The other side of the instrument 45 is connected by conductor 44 to the wiper 39 of potentiometer 40. The wiper 39 is similarly insulated from actuating arm 22 of pressure responsive device 21 as at 46.

The circuit arrangement for the energization of potentiometer 40 from potentiometer 26 results in the electrical equivalent of the formula of angle of attack referred to above. The circuit is a potentiometer multiplying arrangement in which the voltage obtained from potentiometer 26 or between conductors 34 and 35 is equivalent to $$\frac{1}{P_i-P_s}$$

which voltage energizes potentiometer 40. In other words, potentiometer 40 is energized by a source which varies inversely with the pressure difference $P_i-P_s$. Since the distance of the slider 39 from the center tap will be proportional to $P_u-P_l$, it will be obvious that the voltage between slider 39 and the center tap will be proportional to $$\frac{P_u-P_l}{P_i-P_s}$$

It is this voltage which is applied to the meter 45. With a center-tapped potentiometer 40 it is possible to obtain negative and positive angle of attack indications depending upon the difference between $P_u$ and $P_l$, and which of these pressures is of the greater magnitude. Indicator 45 has been shown schematically as a voltmeter with the indicating needle centered for a zero angle of attack condition but it is to be understood that this meter may be substituted by any type of control device which instead of a visual indication could give some controlling function or sound some warning device under predetermined conditions of angle of attack. The meter alone can be used as a stall warning indicator in that a certain portion of its range on either side of the zero position indicates an impending stall condition.

The modification of Figure 2 utilizes the same pressure head with the same angular orifice openings and the conventional Pitot static arrangement as was discussed in connection with Figure 1. The differential pressure responsive devices 55 and 61 are substantially the same as those disclosed as 15 and 21 respectively in Figure 1 with the exception that their outputs are utilized in a somewhat different manner. Pressure responsive device 55 responds to the difference between impact and static pressures and pressure responsive device 61 responds to the difference between the pressures at the angle of attack orifices. Pressure responsive device 55 has an actuating arm 58 which actuates a suitable control device 60. Control device 60 is shown in block form but it is to be understood that it can take the form of the voltage divider 26 in Figure 1 or the form of the inductance device with amplifier and rectifier of Figure 3. This control device as shown in Figure 2 is energized by suitable source of direct current 62 through conductors 63 and supplies a current proportional to the pressure difference $P_i-P_s$ through conductors 64 to energizing coil 65 of the magnetic spring 66. Magnetic spring 66 includes stationary core members 67 of magnetic material upon which the coils 65 are positioned and a soft iron armature 70 which is mounted upon and magnetically insulated from an operating rod or bar 72 of pressure responsive device 61. Upon energization of the coils 65, the flux lines from the electromagnetic cores 67 pass through the armature 70 and tend to align it with the cores 67 to keep the air gap between these parts at a minimum. The aligning force is made to be proportional to the exciting current and to the displacement of armature 70 from its equilibrium position by suitable design of the magnetic structure, as is well known in the art. Operating arm 72 of pressure responsive device 61 also carries a wiper 79 which cooperates with a winding 78 of a potentiometer 80. As before, the connection between the potentiometer wiper 79 and rod 72 is insulated. Potentiometer 80 derives its energization from a direct current source 90. An indicating instrument 45 in this modification, which is the same as that described in Figure 1, is connected between a center-tap 81 of potentiometer winding 78 and the wiper 79 by means of conductors 83 and 84, respectively.

In this embodiment, the potentiometer 80 with wiper 79, which is actuated by the difference in pressure between the angle of attack orifices, is energized from a constant source. In place of varying the energization of potentiometer 80 to impress thereon the variable effect of impact pressure minus static pressure, the magnetic spring imposes a variable restoring force upon the arm 72 carrying wiper 79 in such a manner that the restoring force is continuously adjusted to be proportional to the pressure difference $P_i-P_s$. Hence the present arrangement, instead of permitting wide ranges of movement of the potentiometer wiper 79 upon increased air speed conditions with their consequent large pressure differences, and counteracting this effect by reducing the potential applied to the potentiometer winding, provides for constant energization of the potentiometer winding 78 and increased reshunt to movement of the potentiometer wiper 79 upon increased air speed, such that the signal remains constant for a constant value of angle of attack. This arrangement fulfills the equation $$\frac{P_u-P_l}{P_i-P_s}$$

and the signal impressed upon indicating instrument 45 is a direct measure of the angle of attack.

The preferred embodiment of Figure 3 combines the principles of Figures 1 and 2 and utilizes the same sensing head including the conventional Pitot static head openings or orifices and the angle of attack orifices disposed above and below the impact orifice of this unit. The orifices of head 10 are connected by tubes 14 and 20 respectively to differential pressure responsive devices 115 and 121. Pressure responsive devices 115 and 121 are similar to those described in connection with Figures 1 and 2 and need not be further described. Pressure responsive device 115 carries an actuating rod 118 which responds in movement to the difference in pressures between impact pressure $P_i$ and static pressure $P_s$. Similarly device 121 has a rod 122 which responds in movement to the difference in pressure between the angle of attack orifices $P_u$ and $P_l$. Device 115, through rod 118, actuates a magnetic armature 130 of an inductive device 131. Inductive device 131 includes an E-shaped core member of magnetic material 132 upon the outside legs of which are positioned a pair of input coils 133 connected in series with one another and with the secondary winding 135 of an input transformer 136 whose primary winding 137 is energized by a suitable source of A. C. power. Positioned upon the centrally disposed leg of the E-shaped core member 132 of inductive device 131 is an output winding 140 which is connected by means of conductors 141 to an amplifier indicated generally at 150. Through suitable design the output voltage of winding 140 is proportional in amplitude to the displacement of armature 132 from a null or no-signal position. This amplifier 150 forms no part of this invention other than to magnify the A. C. output of winding 140 of inductive device 131, and has been illustrated schematically as a box which will be deemed to contain and operate as a conventional stable amplifying device and powered from any suitable source. The output of the amplifier is rectified by a rectifier indicated schematically at 151, and the output of the rectifier 151 is supplied to magnetic springs or electromagnetic biasing means 161, 171 in a manner which will be later noted.

Actuating rod 118 of pressure responsive device 115 also carries an armature 160 of a magnetic spring means 161. Armature 160 is made of a magnetic material and is magnetically insulated from the remaining portion of rod 118. It cooperates with stationary cores 162 upon which are positioned energizing coils 163. Energizing coils 163 are connected in series with energizing coils 172 of a similar magnetic spring 171 so that the same energizing current is applied to each magnetic spring from rectifier 151. A conductor 165 connects one extremity of coils 163 to rectifier 151 and a conductor 166 connects the opposite extremity of coils 163 in series with one extremity of coils 172 of magnetic spring 171. The opposite extremity of coils 172 is connected through a conductor 167 to the other terminal of rectifier 151. The magnetic springs 161, 171 are thus energized from the amplifier 150 controlled by output coil 140 of the inductance device 131 as follows: amplifier 150, rectifier 151, conductor 165, coils 163, conductor 166, coils 172, conductor 167, and rectifier 151 to amplifier 150.

Operating rod 122 of pressure-responsive device 121 carries the armature 173 of magnetic spring 171, which cooperates with the stationary core 174 to exert a restoring force proportional to displacement and to exciting current. Armature 173 is made of magnetic material as is the core member 174 upon which the coils 172 are positioned.

Also mounted on the operating arm 122 is an armature 180 of an inductive device 181. Inductive device 181 has an E-shaped core member 182 upon the outer legs of which are mounted input coils 183, which coils are energized from a secondary winding 138 of transformer 136, whose primary winding 137 is energized from a suitable source of A. C. voltage. The secondary or output coil 184 of inductive device 181 is mounted on the inner leg or core member 182 and is connected by means of conductors 185 to a phase sensitive rectifier 144. Rectifier 144 is shown in block diagram since it is well known in the art and forms no part of this invention. Conductors 186 energize the phase sensitive rectifier from the A. C. source or primary side of transformer 136 so that a reference signal is obtained thereby. Conductors 187 connect an indicating instrument 145 to the phase sensitive rectifier 144, instrument 145 being merely a D. C. voltmeter calibrated to indicate angle of attack. It will readily be seen that the inductive device 181 may be replaced by a control device energized from a direct current source and rectification of the signal will then not be required.

Operation of the preferred embodiment illustrated in Figure 3 will now be described. Movement of rod 118 of pressure responsive device 115 in response to a pressure difference $P_i-P_s$ causes displacement of armature 130 from the null position at which no output signal is delivered by coil 140 to amplifier 150. The signal which is then delivered by coil 140 is amplified by amplifier 150, rectified by rectifier 151, and energizes magnetic spring 161. Magnetic spring 161 exerts a restoring force on rod 118, causing it to move back toward the null position. This motion decreases the output signal from coil 140, thereby reducing the excitation to magnetic spring 161. Equilibrium is reached when the displacement of rod 118 is just sufficient to produce an excitation of the magnetic spring 161 such that the force exerted balances that due to the pressure difference $P_i-P_s$ plus that due to the mechanical spring rate of the pressure responsive device 115. By suitable design the mechanical spring rate is made low and the gain of the amplifier is made high: the force exerted by the magnetic spring 161 is then proportional to the pressure difference $P_i-P_s$. Since the force exerted by the magnetic spring 161 is directly proportional to the current flowing through its energizing coils 163, it follows that this current is directly proportional to the pressure difference $P_i-P_s$.

Since the energizing current of magnetic spring 161 is also, by virtue of the series connection, the energizing current for magnetic spring 171, it follows that the spring rate against which the actuating member 122 of pressure-responsive device 121 operates is proportional to $P_i-P_s$. By making the mechanical spring rate of pressure-responsive device 121 low, the force exerted by the magnetic spring 171 is substantially that required to balance the pressure difference $P_u-P_l$. The deflection of member 122 is then directly proportional to the pressure difference $P_u-P_l$ and inversely proportional to the pressure difference $P_i-P_s$, and is therefore directly proportional to the angle of attack at any air speed.

Deflection of member 122 must be indicated; in Figures 1 and 2 this was disclosed as being done by a potentiometer feeding a meter. Any other of the many devices well known in the art for indicating displacement may be used within the scope of the present invention; by way of further illustration a magnetic pickup device or inductance device 181 is shown in Figure 3 as performing this function. When armature 180 of the inductance device 181 is in its zero position corresponding to zero pressure difference $P_u - P_l$, equal and opposite coupling from its exciting or input coils 183 to pickup or output coil 184 obtains and the voltage induced in coil 184 is zero. As the armature 180 moves from this null position due to the variation in the difference between the pressures $P_u$ and $P_1$, the coupling from the exciting coil 182 to output coil 184 varies and an A. C. output is obtained proportional to this pressure difference. The signal thus obtained from output coil 184 is supplied to the phase sensitive rectifier, which is also energized with a standard voltage or reference to determine phase relationship of the signal and the output of the phase-sensitive rectifier 144 energizes the indicating instrument 145 to give an indication of the angle of attack sensed.

Although it has not been specifically disclosed on the drawings, it will be readily comprehended that the indicating apparatus described herein may be used to sense movement of a craft through a surrounding medium, such as air with respect to other of its axes than the axial relationship known as angle of attack. Similarly, movement of a craft through surrounding air may be indicated for more than one axis at the same time. The disclosure of Figures 2 and 3 can particularly be adapted for such usage when one or more pairs of angularly spaced orifices are provided to sense movement of the craft in one or more directions or with respect to one or more axes, the effect of each responsive means for each pair of orifices being modified by the single air speed responsive means to give accurate and calibrated indications of each separate angular movement of the craft.

In considering this invention it should be kept in mind that the present enclosures are intended to be illustrative only and the scope of the invention is to be determined only by the appended claims.

We claim as our invention:

1. An angle of attack indicator for an aircraft comprising a pressure sensing head having impact and static pressure openings and vertically disposed angle openings in which are pressures dependent upon the angle of attack of the aircraft, a first pressure bellows responsive to the difference in pressure in the angle openings of said pressure sensing head, an electrical signal generating means including a pair of relatively movable parts one of which is connected to said first pressure bellows and movable therewith such that the output of said signal generating means is controlled thereby in proportion to the difference in pressures in the angle openings, a second pressure bellows responsive to the difference in pressure between the impact pressure and static pressure of said pressure sensing head, a second electrical signal generating means including a pair of relatively movable parts one of which is connected to said second pressure bellows and movable therewith such that the output of said second signal generating means is controlled thereby in proportion to the difference between impact and static pressures, electromagnetic brake means including relatively movable parts one of which is mounted on said first bellows means, said brake means being connected to and energized from said last named signal generating means to vary the movement of said first pressure bellows, and means connected to and energized from the output of said first signal generating means to indicate angle of attack.

2. An angle of attack measuring apparatus for an aircraft comprising a pressure sensing head having impact and static pressure openings and vertically disposed angle openings in which are pressures dependent upon the angle of attack of the aircraft, a first pressure bellows responsive to the difference in pressure in the angle openings of said pressure sensing head, an electrical signal generating means including a pair of relatively movable parts one of which is connected to said first pressure bellows and movable therewith such that the output of said signal generating means is controlled thereby in proportion to the difference in pressure in said angle openings, a second pressure bellows responsive to the difference in pressure between the impact pressure and static pressure of said pressure sensing head, a second electrical signal generating means including a pair of relatively movable parts one of which is connected to said second pressure bellows and movable therewith such that the output of said second signal generating means is controlled thereby in proportion to the difference between impact and static pressures, electromagnetic brake means including relatively movable parts one of which is mounted on said first bellows means, said brake means being connected to and energized from said last named signal generating means to vary the spring rate of said first pressure bellows in proportion to the difference between static and impact pressures, the output of said first named signal generating means being proportional to angle of attack of the aircraft at any airspeed.

3. An angle of attack indicator for an aircraft comprising a pressure sensing head having impact and static pressure openings and vertically disposed angle openings in which are pressures dependent upon the angle of attack of the aircraft, a first pressure bellows responsive to the difference in pressure in the angle openings of said pressure sensing head, an electrical signal generating means including a pair of relatively movable parts one of which is connected to said first pressure bellows and movable therewith such that the output of said signal generating means is controlled thereby in proportion to the difference in pressures at said angle openings, a second pressure bellows responsive to the difference in pressure between the impact pressure and static pressure of said pressure sensing head, a second electrical signal generating means including a pair of relatively movable parts one of which is connected to said second pressure bellows and movable therewith such that the output of said second signal generating means is controlled thereby in proportion to the difference between impact and static pressures, electrical means mounted in part on said first named bellows means and connected in an electrical circuit with said last named signal generating means for varying the spring rate of said first named bellows means, and means connected to and energized from the output of said first named signal generating means to indicate angle of attack.

4. A device for measuring attitude of an aircraft with respect to the surrounding air including an indicator, means responsive to the difference of pressures at two angularly spaced points on said aircraft in the plane of change of attitude of said aircraft, means responsive to airspeed, a first electrical signal generating means including a pair of relatively movable parts one of which is mounted on said pressure responsive means and movable therewith such that the output of said signal generating means will be controlled thereby, a second electrical generating means including a pair of relatively movable parts one of which is mounted on said airspeed responsive means and movable therewith such that the output of said second signal generating means will be controlled thereby in proportion to the movement of said airspeed responsive means, a pair of magnetic spring means each having a pair of relatively movable parts with a part from each spring means mounted respectively on said pressure responsive means and said airspeed responsive means, circuit means connecting said magnetic springs and said second electrical signal generating means such that said magnetic springs will be energized from the output of said second signal generating means, and circuit means connecting said first named signal generating means to said indicator such that said indicator will be energized from the output of said first signal generating means.

5. A device for measuring attitude of an aircraft with respect to the surrounding air including an indicator, means responsive to the difference in pressures at two angularly spaced points on said aircraft in the plane of change of attitude of said aircraft, means responsive to airspeed, a first electrical signal generating means including a pair of relatively movable parts one of which is mounted on said pressure responsive means and movable therewith such that the output of said signal generating means will be controlled thereby, a second electrical signal generating means including a pair of relatively movable parts one of which is mounted on said airspeed responsive means and movable therewith such that the operation of said second signal generating means will be controlled thereby in proportion to the movement of said airspeed responsive means, electrical means mounted in part on said pressure responsive means and connected in an electrical circuit with said second electrical signal generating means to be energized by said second signal generating means for modifying non-linearly the operation of said pressure responsive means, and circuit means connecting said first electrical signal generating means to said indicator for energizing said indicator to give an indication of attitude of the aircraft.

6. A device for measuring attitude of an aircraft with respect to the surrounding air including an indicator, means responsive to difference in values of pressures at two angularly spaced points on said aircraft in the plane of change of attitude of said aircraft, means responsive to airspeed, a first electrical signal generating means including a pair of relatively movable parts one of which is mounted on said pressure responsive means and movable therewith such that the output of said signal generating means will be controlled thereby, a second electrical signal generating means including a pair of relatively movable parts one of which is mounted on said airspeed responsive means and movable therewith such that the operation of said second signal generating means will be controlled thereby in proportion to the movement of said airspeed responsive means, and electrical means connected in part to said pressure responsive means and electrically connected to and energized from the output of said second electrical signal generating means for modifying the operation of said pressure responsive means to compensate for the effect of airspeed on the value of said pressures, and circuit means connecting said first named electrical signal generating means to said indicator for energizing the same.

7. Apparatus for measuring a condition determined by a pressure differential and a second variable condition, comprising, a first electrical signal generating means including a pair of relatively movable parts, means operated by said pressure differential and connected to one of said parts of said first electrical signal generating means for controlling the output of said first signal generating means in proportion to said pressure differential, a second electrical signal generating means including a pair of relatively movable parts, means connected to one of said parts of said second electrical signal generating means and responsive to said second condition for controlling the output of said second signal generating means in proportion to the magnitude of said second condition, means electrically connected to said second signal generating means and energized therefrom being mounted in part on said pressure differential operated means for modifying non-linearly the operation of said pressure differential operated means, and means connected to and energized by said first signal generating means to indicate a measure of said first named condition.

8. Apparatus for measuring a condition determined by a pressure differential and a second variable condition, comprising, a first electrical signal generating means including a pair of relatively movable parts, means operated by said pressure differential and connected to one of said parts of said first electrical signal generating means for controlling the output of said first signal generating means in proportion to said pressure differential, a second electrical signal generating means including a pair of relatively movable parts, means connected to one of said parts of said second electrical signal generating means and responsive to said second condition for controlling the output of said second signal generating means in proportion to the magnitude of said second condition, magnetic spring means comprising a pair of relatively movable parts one part of which is mounted on said pressure differential operated means, circuit means connecting said magnetic spring means to said second electrical signal generating means to energize said magnetic spring from the output of said second signal generating means, said magnetic spring means operating to modify non-linearly the operation of said pressure differential operated means in proportion to the output of said second signal generating means, and means connected to and energized from said first signal generating means to indicate a measure of said first named condition.

9. An angle of attack indicating apparatus for aircraft comprising a pressure sensing head having impact and static pressure opening and vertically disposed angle openings in which are sensed pressures depending upon angle of attack of the aircraft, means responsive to the pressure differential between impact and static pressure, a first electrical signal generating means including a pair of relatively movable parts one of which is attached to said pressure responsive means and operated thereby such that the output of said signal generator is proportional to the pressure differential between impact and static pressure, a first magnetic spring, means responsive to the pressure differential between the angle of opening pressures, a second electrical signal generating means including a pair of relatively movable parts one of which is attached to said second named pressure responsive means and operated thereby such that the output of said second signal generator is proportional to said pressure differential between the angle opening pressures, a second magnetic spring, said first and second magnetic spring being electrically connected to and energized from said first signal generating means and mechanically attached respectively to said first named pressure responsive means and said second named pressure responsive means and operable to vary the spring rates of said first and second named pressure responsive means; and means connected to and energized by the output of said second signal generating means to indicate angle of attack.

OSCAR HUGO SCHUCK.
ROSS C. ALDERSON.

References Cited in the file of this patent

UNITED STATES PATENTS

| Number | Name | Date |
|---|---|---|
| 2,237,306 | Hood | Apr. 8, 1941 |
| 2,457,287 | Townes | Dec. 28, 1948 |
| 2,475,314 | Dehmel | July 5, 1949 |
| 2,537,932 | Kliever | Jan. 9, 1951 |